United States Patent

Pavia

[15] 3,688,803
[45] Sept. 5, 1972

[54] DUCTING

[72] Inventor: Robert J. Pavia, 4 Colville Court, P.O. Box 75, Kanata, Ontario, Canada

[22] Filed: Dec. 11, 1969

[21] Appl. No.: 884,272

[52] U.S. Cl..................................................138/173
[51] Int. Cl.................................................F16l 9/02
[58] Field of Search............138/172, 173, 121–156, 138/178, DIG. 4; 98/40 C; 220/72

[56] References Cited

UNITED STATES PATENTS

| | | |
|---|---|---|
| 2,802,487 | 8/1957 | Breehl......................138/156 |
| 2,063,013 | 12/1936 | Cooper.........................220/72 |
| 455,910 | 7/1891 | Gordon...................138/173 X |
| 469,731 | 3/1892 | Althouse................138/173 X |
| 494,033 | 3/1893 | Silverman..............138/173 X |

Primary Examiner—Carlton R. Croyle
Assistant Examiner—Richard Sher
Attorney—Smart & Biggar

[57] ABSTRACT

Sheet-metal ducting comprising a conduit section being stiffened by a plurality of integral ribs extending longitudinally, the ends of said integral ribs being spaced inwardly of the ends of said conduit section.

2 Claims, 6 Drawing Figures

PATENTED SEP 5 1972 3,688,803

INVENTOR
ROBERT J. PAVIA
BY *Smart & Biggar*
ATTORNEYS

DUCTING

This invention relates to sheet-metal ducting formed by one or more conduit sections which may be joined together in end-to-end relationship to form an elongated duct.

BACKGROUND OF THE INVENTION

Specifications for conventional sheet-metal ducting are such that as the cross-sectional area of a duct increases, the thickness of sheet-metal from which the duct is formed increases and for any given cross-sectional area a standard guage of sheet-metal must be used. In the case of ducts which have relatively large flat areas making up one or more walls of the duct means must be provided whereby such flat areas are stiffened in order to prevent "booming" resulting from changes of pressure within such ducts. The conventional way of so stiffening the flat surfaces of a duct is by "cross-breaking," i.e., by bending the sheet-metal (assuming a rectangular configuration) twice, once along each diagonal. Although this method of stiffening flat sheet-metal surfaces is widely used, it does not completely solve the problem and "booming" may still occur as a result of pressure changes within the duct. Furthermore, cross-breaking is time consuming and expensive. Normally eight separate bends are required for each conduit section making a rectangular duct, two for each of the four walls.

SUMMARY OF THE INVENTION

I have found that I can provide a duct which may be formed of lighter guage material than is normally specified (thereby reducing weight and cost), and which overcomes the necessity of cross-breaking. As in the prior art, the duct according to my invention is made up of a number of conduit sections which are joined together in end-to-end relationship. However, the duct differs in that each conduit section is stiffened by the provision of a plurality of integral ribs each of which extends longitudinally of the conduit section over a major portion of its length. The integral ribs also are designed such that their ends are spaced inwardly from the ends of the conduit section so that the ends of each conduit section present an unbroken regular configuration. Thus two or more conduit sections may be joined together in a conventional manner in end-to-end relationship in order to form an elongated duct. The conduit sections formed in accordance with my invention have greater inherent strength than the cross-broken ones of the prior art and as a result they may be formed of lighter guage sheet-metal. Furthermore, the problem of "booming" noted above is virtually eliminated.

DESCRIPTION OF THE DRAWINGS

In the drawings which illustrate embodiments of the invention, and in which like numerals refer to like parts.

DETAILED DESCRIPTION OF PREFERRED EMBODIMENT

Figure 1:
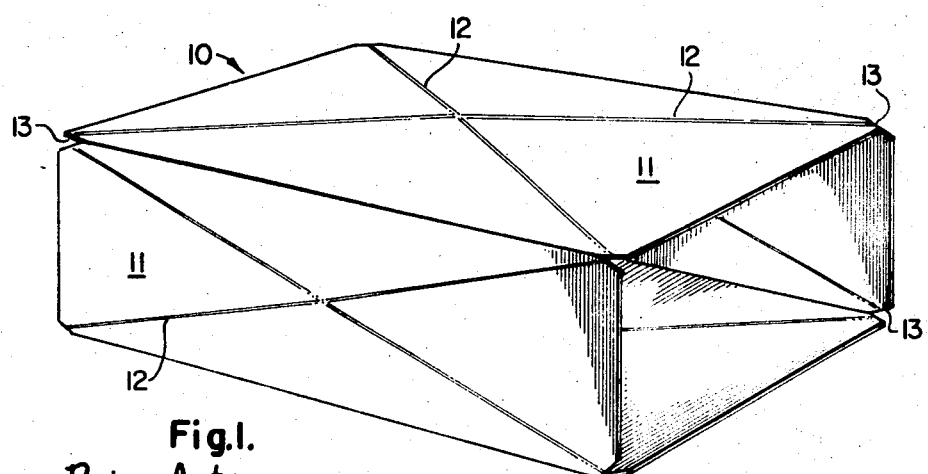
FIG. 1 is a view in perspective of a rectangular conduit section formed in accordance with the method of the prior art.

Referring now to FIG. 1 of the drawings, there is illustrated a rectangular conduit section 10 formed in accordance with the prior art. Each of the four walls 11 are cross-broken in a conventional manner along diagonals 12 in an attempt to structurally strengthen the said walls and to prevent "booming" arising from pressure changes within the assembled duct when in use. In accordance with standard practice notches 13 are provided in each of the four corners at each end of the conduit section 10 in order to facilitate inter alia the joining of two conduit sections together.

Figure 2:
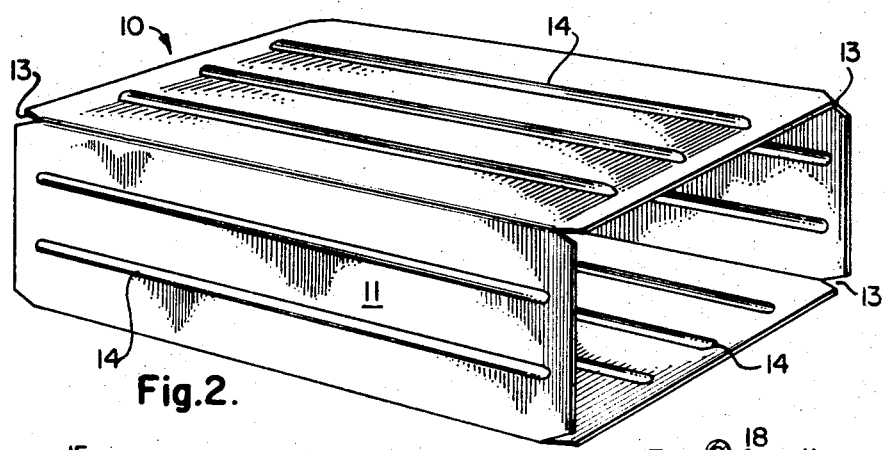
FIG. 2 is a view in perspective of a rectangular conduit section formed in accordance with the invention.

FIG. 2 illustrates a conduit section formed in accordance with my invention. My invention differs from the prior art in that conduit 10 is provided with a plurality of integral longitudinal ribs 14 in side walls 11. Ribs 14 are preferably semi-circular in cross-section and I have found that for normal ducting installations they may be spaced about 12 inches apart and may be about half an inch wide and about one-quarter of an inch deep. With a one-half inch rib width and a twelve inch spacing between ribs, the ratio is 1 to 24 or approximately 4 percent. Depending upon the choice of the manufacturer, the ribs 14 may open either into or out of the duct. It will be seen that although ribs 14 extend over a major portion of the length of conduit section 10 they terminate a short distance from its ends in order to prevent distorting the ends of the conduit section so that two or more conduit sections 10 may be joined together in end-to-end relationship in order to provide an elongated duct in a conventional manner.

The ribs 14 may be formed in the sheet-metal after it has been cut to length by any conventional method. One such method which I have found to be successful is roll forming, but other methods could be used. Since the forming of the ribs to themselves do not form any part of my invention, it is believed that no further description of the method will be necessary to one skilled in the art.

Figure 4:
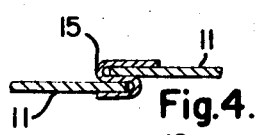
FIG. 4 is a sectional side view of a joint between two conduit sections.
Figure 6:
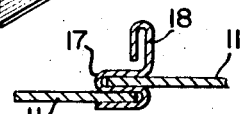
FIG. 6 is a sectional side view of still another joint between two conduit sections.
Figure 5:
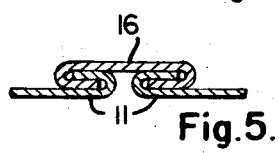
FIG. 5 is a sectional side view of another joint between two conduit sections.

FIGS. 4, 5, and 6 illustrate three conventional methods of joining two conduit sections 10 together. FIG. 4 shows what may be described as a flat-S slip joint comprising an S-shaped member 15 adapted to receive and secure together corresponding walls 11 of two adjacent conduit sections 10. FIG. 5 illustrates a drive cleat joint which comprises essentially an elongated C-shaped member 16 which is adapted to co-act with hooks in walls 11 of conduit sections 10, which hooks are formed by bending walls 11 back against themselves. FIG. 6 shows what is known as a bar slip joint and is a modified form of the joint illustrated in FIG. 4. There is an S-shaped portion 17 similar to the S-shaped member 15 of FIG. 4. However, the member 17 additionally has a protruding portion 18 rising up above the joint in the duct. The purpose of portion 18 is to provide a strengthening member which runs lengthwise of the joint between two conduit sections 10, the configuration of the member 17-18 being such that bending lengthwise of such joint is resisted.

In accordance with ASHRAE specifications, a rectangular duct of 70 × 30 inches be formed of 20-gauge stock while a similar duct of 40 × 20 inches must be formed of 22-gauge stock. ASHRAE specifications presuppose a duct formed in accordance with the prior art as illustrated in FIG. 1 and described above. Ducts of similar dimensions but formed in accordance with my invention may be formed of 22- and 24-gauge stock respectively without any structural disadvantage, and, indeed, may often be formed of 24- and 26-gauge stock respectively. The change from 20- to 22-gauge stock or from 22- to 24-gauge stock, where 20-, 22-, and 24-gauge stock respectively is 0.036, 0.028, and 0.022 (Standard Imperial Gauge) represents a reduction of approximately 20 percent in thickness of the sheet material. Because of the disposition of integral ribs 14, it will be seen that the strength of a duct section made in accordance with my invention is considerably improved in a direction running lengthwise of the duct and this in itself explains why the problem of "-booming" is considerably reduced. If for structural reasons strength is additionally required running crosswise of the duct, a bar slip joint such as is illustrated in FIG. 6 and described above may be advantageously employed. This is, however, the most expensive of the three joints illustrated in FIGS. 4, 5, and 6 and an alternative method described below may be used in conjunction with one of the more inexpensive joints if one uses a module analysis when approaching the designing of a particular duct.

Figure 3:
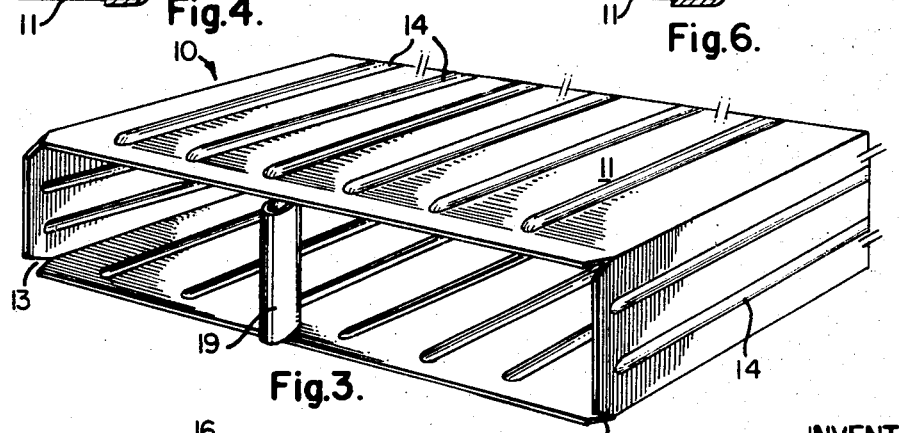
FIG. 3 is a view in perspective of a rectangular conduit section formed in accordance with a second embodiment of the invention.

As indicated above, a duct which is 40 × 20 inches may be formed from 24- or 26-gauge stock rather than 22-gauge stock if integral ribs 14 are provided in accordance with my invention. The size of the duct may be increased to 80 × 20 inches without increasing stock thickness if the conduit sections are formed as shown in FIG. 3. FIG. 3 differs from FIG. 2 only in that braces 19 (preferably of an air-foil configuration in order not to disturb the flow through the completed duct as little as possible) are placed spanning the joint and midway between the 80-inch walls and parallel to the 20-inch walls. From a structural point of view, the duct then essentially comprises two modules 20 × 40 inches in size, one beside the other. Ribs 14 provide all the strength that is required running lengthwise of the duct and prevent "booming" when the duct is in use. The support members 19 provide strength running crosswise of the duct thereby avoiding the use of either heavier gauge metal or, in the alternative, a costly bar slip joint such as is illustrated in FIG. 6.

It is not intended to limit the invention to the embodiment above described, the invention being as defined in the appended claims.

What I claim as my invention is:

1. A sheet-metal duct, comprising:
   a. an elongated rectangular cross-sectional duct with four flat panels and four parallel elongated duct edges,
   b. a readily flexed end-connecting section at each end of the duct which includes the flat lateral end portion of the four panels disposed between V-shaped notches at the duct end corners,
   c. a plurality of thin, spaced and parallel reinforcing ribs integrally formed from the flat panels which extend between the end connecting sections,
   d. the reinforcing ribs being parallel to and spaced from the elongated edges of the duct, and the distance between adjacent reinforcing ribs being substantially less than the distance between the reinforcing ribs having a duct edge between them,
   e. the width of the ribs being approximately 4 percent of the width of the flat area on the panels disposed between adjacent ribs,
   f. the thickness of the panels being approximately 20 percent less than the officially specified thickness for panels of the same duct cross-sectional dimensions where conventional stiffening construction is used.

2. Improved sheet-metal ducting as claimed in claim 1 wherein said integral ribs are spaced about 12 inches apart, are of a semi-circular configuration, and are about one-half inch wide and about one-quarter inch deep.

* * * * *